United States Patent [19]
DeBoer et al.

[11] Patent Number: 5,712,223
[45] Date of Patent: Jan. 27, 1998

[54] CHROMEME DYES FOR THERMAL IMAGING

[75] Inventors: Charles David DeBoer, Palmyra; Douglas Robert Robello; Lee William Tutt, both of Webster, all of N.Y.

[73] Assignee: Eastman Kodak Company, Rochester, N.Y.

[21] Appl. No.: 724,290

[22] Filed: Sep. 16, 1996

[51] Int. Cl.[6] .............................. B41M 5/035; B41M 5/38
[52] U.S. Cl. ...................... 503/227; 428/195; 428/480; 428/913; 428/914; 430/201; 430/292; 430/324; 430/945; 430/964
[58] Field of Search ............................. 428/195, 480, 428/913, 914; 430/201, 292, 324, 945, 964; 8/471; 503/227

[56] References Cited

U.S. PATENT DOCUMENTS 4,866,029  9/1989  Evans et al. ........................ 503/227

OTHER PUBLICATIONS

Chem. Reviews, vol. 53, p. 151, 1953, by H.H. Jaffe.

Primary Examiner—Bruce H. Hess
Attorney, Agent, or Firm—Harold E. Cole

[57] ABSTRACT

A dye-donor or recording element comprising a support having thereon a dye layer comprising a yellow dye in a polymeric binder, the dye having the formula:

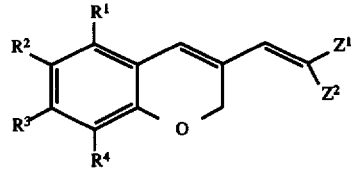

wherein:

$R^1$, $R^2$, $R^3$ and $R^4$ each independently represents hydrogen, halogen, hydroxy, nitro, a substituted or unsubstituted alkyl or alkoxy group of from 1 to about 6 carbon atoms, a substituted or unsubstituted phenyl group, an alkylazo group, or an arylazo group;

or any two adjacent $R^1$, $R^2$, $R^3$ and $R^4$ groups may be taken together with the phenyl ring to which they are attached to form a fused ring system; and $Z^1$ and $Z^2$ each independently represents hydrogen or a moiety having a Hammet Sigma (meta) Constant greater than 0.3, such as cyano, esterified carboxy, amide, benzoxazole, alkylsulfonyl, arylsulfonyl; or may be taken together to form a group having a Hammer Sigma (meta) Constant greater than 0.3.

16 Claims, No Drawings

CHROMEME DYES FOR THERMAL IMAGING

This invention relates to dyes of high efficiency in thermal imaging and, more particularly, to a new class of readily-available chromene dyes which have a yellow hue.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta and yellow signals. The process is then repeated for the other two colors. A color hard copy is thus obtained which corresponds to the original picture viewed on a screen. Further details of this process and au apparatus for carrying it out are contained in U.S. Pat. No. 4,621,271, the disclosure of which is hereby incorporated by reference.

Another way to thermally obtain a print using the electronic signals described above is to use a laser instead of a thermal printing head. In such a laser transfer system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to a receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726A, the disclosure of which is hereby incorporated by reference.

In another mode of imaging using a laser beam, a laser recording element with a dye layer composition comprising an image dye, an infrared-absorbing material, and a binder coated onto a substrate is imaged from the dye side. The energy provided by the laser drives off the image dye and other components of the dye layer at the spot where the laser beam impinges upon the element. In "laser removal" imaging, the laser radiation causes rapid local changes in the imaging layer, thereby causing the material to be removed from the layer. Usefulness of such a laser recording element is largely determined by the efficiency at which the imaging dye can be removed on laser exposure. The transmission Dmin value is a quantitative measure of dye clean-out: the lower its value at the recording spot, the more complete is the attained dye removal.

U.S. Pat. No. 4,866,029 relates to yellow dyes for thermal imaging. There is a problem with these dyes in that they are relatively expensive to make and have high molecular weights.

It is an object of this invention to obtain dyes which are cheap to make, have a low molecular weight, and are readily transferred in thermal dye transfer processes.

These and other objects are achieved in accordance with this invention which comprises a dye-donor or recording element for thermal dye transfer comprising a support having thereon a dye layer comprising a yellow dye dispersed in a polymeric binder, the dye having the formula:

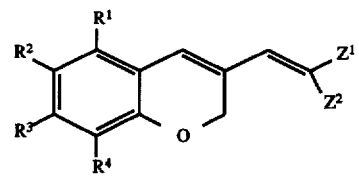

wherein:

$R^1$, $R^2$, $R^3$ and $R^4$ each independently represents hydrogen, halogen, hydroxy, nitro, a substituted or unsubstituted alkyl or alkoxy group of from 1 to about 6 carbon atoms, a substituted or unsubstituted phenyl group, an alkylazo group, or an arylazo group;

or any two adjacent $R^1$, $R^2$, $R^3$ and $R^4$ groups may be taken together with the phenyl ring to which they are attached to form a fused ring system; and $Z^1$ and $Z^2$ each independently represents hydrogen or a moiety having a Hammer Sigma (meta) Constant greater than 0.3, such as cyano, esterified carboxy, amide, benzoxazole, alkylsulfonyl, arylsulfonyl; or may be taken together to form a group having a Hammet Sigma (meta) Constant greater than 0.3 such as a pyrazolone ring or Meldrum's acid residue.

A Hammet Sigma (meta) Constant is defined in Chem. Reviews, Vol. 53, page 191, 1953, by H. H. Jaffe, and is a useful description of the electron-withdrawing power of a moiety.

Examples of dyes included within the scope of the invention include the following:

| Dye | $R^1$ | $R^2$ | $R^3$ | $R^4$ | $Z^1$ | $Z^2$ |
|---|---|---|---|---|---|---|
| 1 | H | H | H | H | CN | CN |
| 2 | H | H | H | H | CN | $COOC_2H_5$ |
| 3 | H | $OCH_3$ | H | H | CN | $COOC_2H_5$ |
| 4 | H | H | H | $OCH_3$ | CN | CN |
| 5 | H | H | H | H |  | 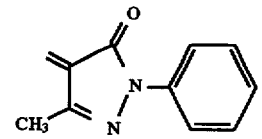 |

-continued

| | | | | | | |
|---|---|---|---|---|---|---|
| 6 | H | Cl | H | H | CN | CN |
| 7 | H | Cl | H | H | CN | COOC$_2$H$_5$ |
| 8 | H | H | H | H | CN | SO$_2$CH$_3$ |
| 9 | H | H | H | H | CN | COC$_6$H$_5$ |
| 10 | H | H | H | H | | (structure) |
| 11 | H | H | H | H | CN | (5-chloro-benzoxazol-2-yl) |
| 12 | H | H | H | H | | (di-tert-butoxycarbonyl methylene) |
| 13 | H | H | H | H | H | (4-methylsulfonylphenyl) |
| 14 | H | NO$_2$ | H | H | H | COOC$_2$H$_5$ |
| 15 | NO$_2$ | H | H | H | CN | CN |
| 16 | H | C$_6$H$_5$—N=N— | H | H | CN | CN |
| 17 | H | H | OH | H | CN | CN |
| 18 | H | H | CH$_3$—N=N— | H | COOC$_2$H$_5$ | CN |
| 19 | H | H | H | H | SO$_2$CF$_3$ | CN |
| 20 | H | H | H | H | H | (4-nitrophenyl) |
| 21 | H | H | H | F | CF$_3$ | |
| 22 | | C$_4$H$_4$ | H | H | CN | CN |

Dyes 1–14 as shown as follows:

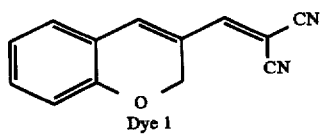
Dye 1

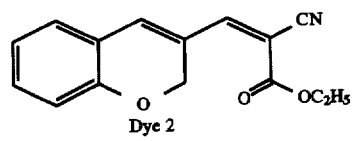
Dye 2

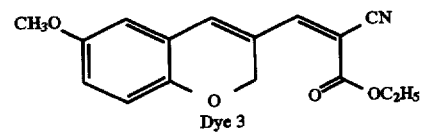
Dye 3

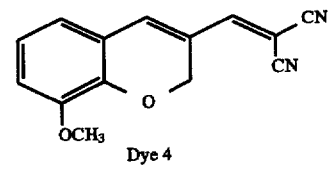
Dye 4

-continued
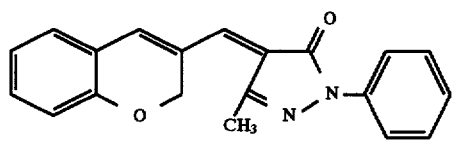
Dye 5
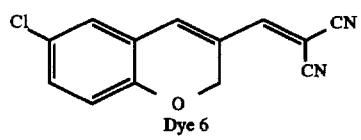
Dye 6
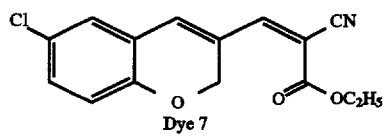
Dye 7
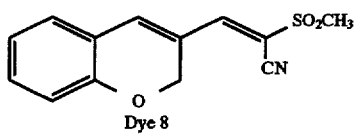
Dye 8
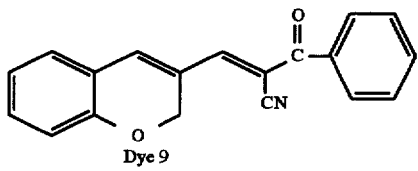
Dye 9
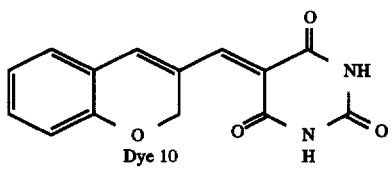
Dye 10
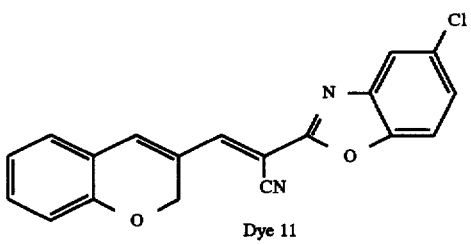
Dye 11
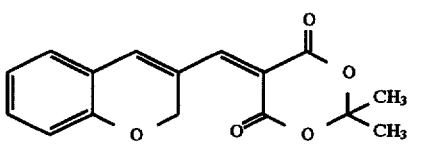
Dye 12
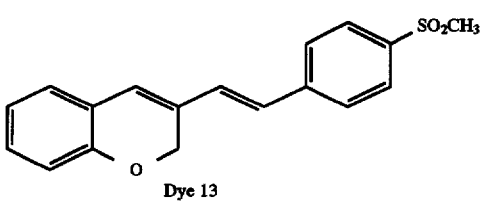
Dye 13

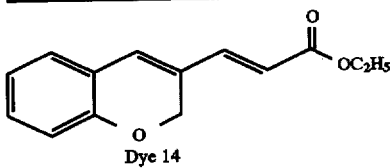
Dye 14

The above dyes employed in this invention are disclosed and claimed in copending application Ser. No. 08/724,291 filed of even date herewith by DeBoer, Robello and Tutt, entitled, "Chromene Dyes", the disclosure of which is hereby incorporated by reference.

In a preferred embodiment of the invention, $R^1$, $R^3$ and $R^4$ each represent hydrogen and $R^2$ represents hydrogen or chloro. In another preferred embodiment, $Z^1$ represents CN and $Z^2$ represents CN, $COOC_2H_5$, $SO_2CH_3$ or $COC_6H_5$.

The above yellow dyes exhibit intense absorption in the blue region of the visible spectrum. Their relatively low molecular weights make them suitable for various imaging processes, such as thermal head and laser dye transfer printing processes and laser ablation or dye removal imaging processes. They have numerous hues which allows one to choose the most desired appearance. They can have significant absorption in the ultraviolet for masking properties (see data hereinafter for Dyes 13 and 14 which have maximum absorption in the near ultraviolet.) These dyes are also highly fluorescent but can be quenched by addition of mobile groups, as in the case with Dyes 5 and 13, when this is undesirable. This class of dyes is simple to make and cheap to synthesize and are extremely versatile in usage.

The yellow dye in the dye-donor or recording element of the invention is dispersed in a polymeric binder such as a cellulose derivative, e.g., cellulose acetate hydrogen phthalate, cellulose acetate, cellulose acetate propionate, cellulose acetate butyrate, cellulose triacetate or any of the materials described in U.S. Pat. No. 4,700,207, a polycarbonate, poly(styrene-co-acrylonitrile), a polysulfone or a poly(phenylene oxide). The binder may be used at a coverage of from about 0.1 to about 5 g/m².

The dye layer of the dye-donor or recording element of the invention may be coated on the support or printed thereon by a printing technique such as a gravure process.

Any material can be used as the support for the dye-donor or recording element of the invention provided it is dimensionally stable and can withstand the heat of the thermal printing heads or laser. Such materials include polyesters such as poly(ethylene terephthalate) and poly(ethylene naphthalate); polysulfones; polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyamides such as polyimide-amides and polyetherimides. The support generally has a thickness of from about 2 to about 30 μm. It may also be coated with a subbing layer, if desired, such as those materials described in U.S. Pat. Nos. 4,695,288 and 4,737,486.

In one embodiment of the invention where the dye is employed in a dye-donor element, the reverse side of the element may be coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. Preferred lubricating materials include oils or semicrystalline organic solids that melt below 100° C. such as poly (vinyl stearate), beeswax, perfluorinated alkyl ester polyethers, polycaprolactone, silicone oil, polytetrafluoroethylene, carbowax, poly(ethylene glycols), or any of those materials disclosed in U.S. Pat. Nos. 4,717, 711; 4,717,712; 4,737,485; 4,738,950; and 4,829,050. Suitable polymeric binders for the slipping layer include poly (vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

A dye-receiving element is used with one embodiment of the invention where the dye is employed in a dye-donor element. The dye-receiving element comprises a support having thereon a dye image-receiving layer. The support may be a transparent film such as a poly(ether sulfone), a polyimide, a cellulose ester such as cellulose acetate, a poly(vinyl alcohol-co-acetal) or poly(ethylene terephthalate). The support for the dye-receiving element may also be reflective such as baryta-coated paper, polyethylene-coated paper, white polyester (polyester with a white pigment incorporated therein), an ivory paper, a condenser paper or a synthetic paper such as DuPont Tyvek®.

The dye image-receiving layer may comprise, for example, a polycarbonate, a polyurethane, a polyester, poly (vinyl chloride), poly(styrene-coacrylonitrile), polycaprolactone or mixtures thereof. The dye image-receiving layer may be present in any mount which is effective for the intended purpose. In general, good results have been obtained at a concentration of from about 1 to about 5 g/m².

As noted above, in one embodiment of the invention, a dye-donor element is used to form a dye transfer image. Such a process comprises imagewise-heating a dye-donor element as described above and transferring a dye image to a dye-receiving element to form the dye transfer image.

The dye-donor element Of the invention may be used in sheet form or in a continuous roll or ribbon. If a continuous roll or ribbon is employed, it may have only the dye thereon as described above or may have alternating areas of other different dyes, such as sublimable cyan and/or magenta and/or yellow and/or black or other dyes. Such dyes are disclosed in U.S. Pat. Nos. 4,541,830; 4,698,651; 4,695,287; 4,701,439; 4,757,046; 4,743,582; 4,769,360; and 4,753,922; the disclosures of which are hereby incorporated by reference. The above dyes may be employed singly or in combination. The dyes may be used at a coverage of from about 0.05 to about 1 g/m² and are preferably hydrophobic. Thus, one-, two-, three- or four-color elements (or higher numbers also) are included within the scope of the invention.

In a preferred embodiment of the invention, a dye-donor element is employed which comprises a poly(ethylene terephthalate) support coated with sequential repeating areas of cyan, magenta and the yellow dye as described above, and the above process steps are sequentially performed for each color to obtain a three-color dye transfer image. Of course, when the process is only performed for a single color, then a monochrome dye transfer image is obtained.

Thermal printing heads which can be used to transfer dye from dye-donor elements employed in one embodiment of the invention are available commercially. There can be employed, for example, a Fujitsu Thermal Head (FTP-A040MCSOO1), a TDK Thermal Head F415 HH7-1089 or a Rohm Thermal Head KE 2008-F3.

A thermal dye transfer assemblage of the invention comprises:

(a) a dye-donor element as described above, and (b) a dye-receiving dement as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

Another embodiment of the invention relates to a process of forming a dye image comprising imagewise-heating, by means of a laser, the recording element described above, the laser exposure taking place through the dye side of the element and causing dye to be removed imagewise to obtain the dye image in the recording element.

The laser recording elements of this invention can be used to obtain medical images, reprographic masks, printing masks, etc. The image obtained can be a positive or a negative image. The dye removal process can generate either continuous (photographic-like) or halftone images.

To obtain a laser-induced image according to the invention, an infrared diode laser is preferably employed since it offers substantial advantages in terms of its small size, low cost, stability, reliability, ruggedness, and ease of modulation. In practice, before an infrared laser can be used to heat a recording element, the element must contain an infrared-absorbing material, such as cyanine infrared-absorbing dyes as described in U.S. Pat. No. 5,401,618 or other materials as described in the following U.S. Pat. Nos. 4,948,777; 4,950,640; 4,950,639; 4,948,776; 4,948,778; 4,942,141; 4,952,552; 5,036,040; and 4,912,083, the disclosures of which are hereby incorporated by reference. The laser radiation is then absorbed into the dye layer and converted to heat by a molecular process known as internal conversion. Thus, the construction of a useful dye layer will depend not only on the hue, transferability and intensity of the image dyes, but also on the ability of the dye layer to absorb the radiation and convert it to heat. The infrared-absorbing dye may be contained in the dye layer itself or in a separate layer associated therewith, i.e., above or below the dye layer. Preferably, the laser exposure in the process of the invention takes place through the dye side of the recording element, which enables this process to be a single-sheet process, i.e., a separate receiving element is not required.

Lasers which can be used in the invention are available commercially. There can be employed, for example, Laser Model SDL-2420-H2 from Spectra Diode Labs, or Laser Model SLD 304 V/W from Sony Corp.

Another embodiment of the invention relates to a process of forming a single color, ablation image comprising:

a) imagewise-heating, by means of a laser, an ablative recording element as described above, which causes the image layer to ablate imagewise, the image layer having a near infrared-absorbing material associated therewith to absorb at a given wavelength of the laser used to expose the element, the image dye absorbing in the region of from about 300 to about 700 nm; and b) removing the ablated material to obtain an image in the ablative recording element.

The following examples are provided to illustrate the invention.

EXAMPLE 1.

The dyes of the present invention were compared against the following control dyes:

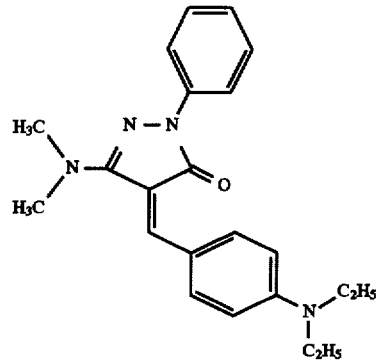

Control 1
(Thermal dye transfer yellow dye as shown in U.S. Patent 4,866,029)

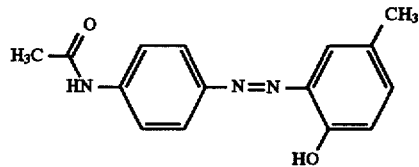

Keyplast Yellow GC-Control 2
(Laser Dye Ablation yellow dye as shown in U.S. Patent 5,521,050)

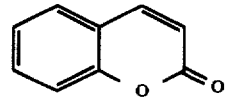

Coumarin-Control 3
(U.S. Patent 4,876,237)
Structurally similar dye

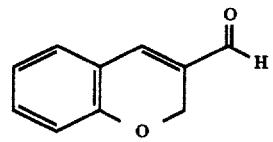

Chromene carboxaldehyde-Control 4
(U.S. Patent 3,796,727)
Structurally similar dye Spectral data were obtained for the dyes listed below in Table 1 in methyl isobutyl ketone (except for Dye 10, which was measured in dimethyl sulfoxide) using approximately 5 mg of dye in 100 ml of solvent in a 1 cm cell.

TABLE 1

| Dye | Wavelength $\lambda_{max}$ (nm) | Extinction Coefficient* ε (L/mol/cm) |
|---|---|---|
| Control 1 | 446 | 45,700 |
| Control 2 | 358 | 20,400 |
| Control 3 | <320 | NM |
| Control 4 | 355 | 6,400 |
| 1 | 414 | 17,050 |
| 2 | 405 | 15,050 |
| 3 | 435 | 11,700 |
| 4 | 425 shoulder | 9,900 |
| 5 | 410 | 13,700 |
| 6 | 415 | 13,200 |
| 7 | 405 | 14,000 |
| 8 | 405 | 13,900 |
| 9 | 404 | 13,100 |
| 10 | 422 | 16,500 |
| 11 | 421 | 24,600 |
| 12 | 417 | 14,100 |
| 13 | 366 | 19,700 |
| 14 | 359 | 16,000 |

*Liters per mole per cm
NM = Not measured

Dye-Donor Element

Dye-donor elements were prepared by applying a slipping layer on the backside of a 12.5 μm poly(ethylene terephthalate) film consisting of a coating mixture of 0.38 g/m² poly(vinyl acetal) (KS-1 from Sekisui Corp.), 0.02 g/m² candelilla wax, 0.003 g/m² p-tolenesulfonic acid, and 0.01 g/m² (PS-513 from Huels America) coated from diethyl ketone. The dye coating was then applied to the front side of the support consisting of 0.27 g/m² of the respective dye and 0.32 g/m² cellulose acetate propionate (20 sec viscosity).

Printing

A dye-receiving element was prepared by coating a mixture of MakroIon 5705® (Bayer AG Corporation) polycarbonate resin (2.9 g/m²) and Tone-PCL300® polycaprolactone (Union Carbide Co.) (0.8 g/m²) in dichloromethane on a titanium dioxide pigmented polyethylene-overcoated paper stock.

The dye side of the dye-donor element of 10 cm×15 cm in area, was placed in contact with the dye image-receiving layer side of the dye-receiving element of the same area. This assemblage was clamped to a stepper motor-driven, 60 mm diameter rubber roller. A thermal head (TDK No. 8IO630, thermostatted at 31° C.) was pressed with a force of 24.4 Newton (2.5 kg) against the dye-donor element side of the assemblage, pushing it against the rubber roller.

The imaging electronics were activated, causing the donor-receiver assemblage to be drawn through the printing head/roller nip at 11.1 mm/s. Coincidentally, the resistive elements in the thermal print head were pulsed (128 ms/pulse) at 129 ms intervals during a 16.9 ms/dot printing cycle. A stepped image density was generated by incrementally increasing the number of pulses/dot from a minimum of 0 to a maximum of 127 pulses/dot. The voltage supplied to the thermal head was approximately 13.00 v resulting in an instantaneous peak power of 0.214 watts/dot and a maximum total energy of 3.48 mj/dot.

After printing, the dye-donor element was separated from the imaged receiving element and the a*b*L* parameters measured of the maximum coloration patch (the 127 pulses/dot) using an X-Rite Spectrodensitometer (Model 938) from X-Rite Inc., Grandville, Mich. as follows.

TABLE 2

| Dye | a* | b* | L* |
|---|---|---|---|
| Blank receiver | -0.08 | -2.95 | 91.8 |
| Control 1 | 4.01 | 105 | 77.3 |
| Control 2 | -17.9 | 77.4 | 87.2 |
| Control 3 | -0.33 | -3.13 | 90.9 |
| Control 4 | -.30 | -3.03 | 91.2 |
| 1 | -9.78 | 40.9 | 90.2 |
| 2 | -15.4 | 53.1 | 90.8 |
| 3 | 4.66 | 86.7 | 88.0 |
| 4 | -6.88 | 74.0 | 88.0 |
| 5 | 10.3 | 66.6 | 76.4 |
| 8 | -23.1 | 57.5 | 90.7 |
| 9 | -17.7 | 76.5 | 88.2 |
| 10 | -2.88 | 35.5 | 87.2 |
| 11 | -4.30 | 19.2 | 89.9 |
| 12 | -13.4 | 92.8 | 85.7 |
| 13 | -0.26 | -3.19 | 91.2 |
| 14 | -2.99 | -1.72 | 91.1 |

Since hue is related to a* and b* values, a higher b* value indicates a purer yellow hue. It can be seen from the b* values that all dyes, except Dye 13 and Dye 14, are better yellow dyes than are Control 3 and Control 4.

Dyes 13 and 14 are useful ultraviolet dyes.

The receivers containing the transferred dye images were placed under a near UV lamp and the color of any fluorescence noted. The wavelength maxima were found by using a Perkin Elmer Fluorescence Spectrophotometer, (Model LS-5), to excite the dye on the prior samples at 360 nm and then scanning the resulting fluorescence. The following results were obtained:

TABLE 3

| Dye | Color | Peak Wavelengths (nm) |
|---|---|---|
| Blank receiver | light white | 434, 491 |
| Control 1 | very dim light yellow brown | ND* |
| Control 2 | ND | ND |
| Control 3 | ND | ND |
| Control 4 | ND | ND |
| 1 | lemon yellow | 543 |
| 2 | greenish-yellow | 527 |
| 3 | bright orange | 588 |
| 4 | bright orange-yellow | 569 |
| 5 | ND | ND |
| 8 | bright yellow | 537 |
| 9 | orange | 565 |
| 10 | dim red | 587 |
| 11 | orange | 554 (broad) |
| 12 | orange | 580 |
| 13 | ND | ND |
| 14 | bright blue | 467 |

*ND — None Detected

The above data show that most of the chromene dyes possess strong fluorescence with the exceptions of Dye 5 and Dye 13. Although Dye 10 is dim, it has a red fluorescence which is different and could be used when so desired.

EXAMPLE 2

To a 100 μm thick poly(ethylene terephthalate) support was applied a coating of each of the above dyes consisting of 0.54 g/m² nitrocellulose, 0.27g/m² dye and 0.16 g/m² infrared dye IR-1 from a methyl isobutyl ketone/ethanol (3:1) solvent mixture.

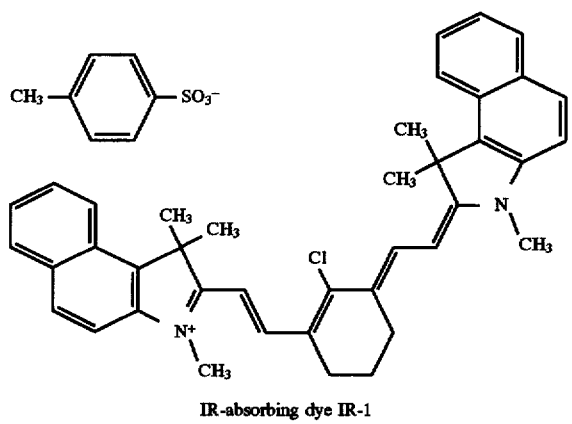

IR-absorbing dye IR-1

Each of the coatings was ablation written using a laser diode print head, where each laser beam has a wavelength range of 830–840 nm and a nominal power output of 600 mW at the film plane. The drum, 53 cm in circumference was rotated at varying speeds and the imaging electronics were activated to provide adequate exposure. The translation stage was incrementally advanced across the dye ablation element by means of a lead screw mined by a microstepping motor, to give a center-to-center line distance of 10.58 μm (945 lines per centimeter or 2400 lines per inch). An air stream was blown over the dye ablation element surface to remove the ablated dye. The ablated dye and other effluents were collected by suction. The measured total power at the focal plane was 600 mW per channel. At a rotation of 1040 rpm, the exposure was about 620 mj/cm². The Status A Blue optical density of the imaged area and the non-imaged areas were measured using an X-Rite Photographic Densitometer (Model 310). The following results were obtained:

TABLE 4

| Dye | Status A Yellow Dmin | Status A Yellow Dmax |
|---|---|---|
| Control 1 | 0.14 | 3.20 |
| Control 2 | 0.08 | 1.14 |
| Control 3 | 0.06 | 0.18 |
| Control 4 | 0.07 | 0.24 |
| 1 | 0.16 | 0.95 |
| 2 | 0.10 | 1.14 |
| 3 | 0.10 | 1.41 |
| 4 | 0.10 | 1.38 |
| 5 | 0.09 | 1.13 |
| 8 | 0.09 | 0.99 |
| 9 | 0.11 | 1.38 |
| 10 | 0.12 | 1.75 |
| 12 | 0.10 | 1.61 |
| 13 | 0.06 | 0.20 |
| 14 | 0.06 | 0.20 |

The above data show that most of the dye was removed in the non-imaged or Dmin areas and that a useful image was achieved. The lower Dmax reflects the different hues and the different extinction coefficients of the various dyes. Higher Dmax could be achieved by higher laydowns. Because of their higher Dmax values, the chromenes are better yellow dyes than are Control 3 and Control 4 for laser dye ablation except for Dye 13 and Dye 14 which absorb predominately in the near ultraviolet.

EXAMPLE 3

Coatings of each of the dyes were made as in Example 2. On the printing drum of Example 2 was placed a sheet of Kodak Approval® Intermediate Receiver as disclosed in U.S. Pat. No. 5,300,398. The coatings were placed dye side down against the Intermediate receiver. The material was printed as in Example 2 except that exposure occurred through the coating support. The coating and receiver were separated and the receiver was laminated to paper at a temperature of 125° C. using a Kodak Approval® Laminator. The Status A blue density of the transferred dye was then measured using an X-Rite Photographic Densitometer (Model 310) fitted with a reflection head. The following results were Obtained:

TABLE 5

| Dye | Status A Blue |
|---|---|
| Control 1 | 1.88 |
| Control 2 | 1.29 |
| Control 3 | 1.69 |
| Control 4 | 0.55 |
| 1 | 0.88 |
| 2 | 0.67 |
| 3 | 0.96 |
| 4 | 0.96 |
| 5 | 0.73 |
| 8 | 1.21 |
| 9 | 1.28 |
| 10 | 1.42 |
| 12 | 1.41 |
| 13 | 0.77 |
| 14 | 0.81 |

It is apparent that the dyes transferred well. The different densities reflect the different hues and extinction coefficients. Larger densities can be obtained by using a higher laydown in the donor coating. All the chromene dyes transferred better than did Control 3 and Control 4.

Following are synthetic procedures used in preparing the dyes used in this invention.

SYNTHETIC EXAMPLE 1

Chromene 3-carboxaldehyde (Compound A)

One mole of salicaldehyde was stirred with 3 liter of $H_2O$ and 0.05 mole NaOH. A stream of nitrogen was bubbled through 1.5 mole acrolein and then into the salicaldehyde-water mixture. When all the acrolein had been driven into the solution (16 hours), the mixture was acidified with 0.06 mole HCl, extracted with methylene chloride and the product separated by vacuum distillation as a pale yellow solid.

SYNTHETIC EXAMPLE 2

8-Methoxy-chromene 3-Carboxaldehyde (Compound B)

One mole of o-vanillin was stirred with 3 liter $H_2O$ and 0.05 mole NaOH. A stream of nitrogen was bubbled through 1.5 moles acrolein and then into the o-vanillin-water mixture. When all the acrolein had been driven into the solution (16 hours) the mixture was acidified with 0.06 mole of HCl and the intermediate product (a light yellow crystalline solid) was filtered off and washed with $H_2O$.

SYNTHETIC EXAMPLE 3

6-Methoxy-chromene 3-carboxaldehyde (Compound C)

5-Methoxy salicaldehyde (4.0 g) was added to 100 ml $H_2O$. To the mixture was added 0.25 g NaOH, followed by dropwise addition of 4.0 g acrolein, and the solution was

SYNTHETIC EXAMPLE 4

6-Chloro-chromene 3-carboxaldehyde
(Compound D)

The procedure from Synthetic Example 3 was followed starting from 2-hydroxy-5-chlorobenzaldehyde (4.0 g).

SYNTHETIC EXAMPLE 5

Dye 1

The product of Synthetic Example 1 (Compound A) was dissolved in 1 liter methanol along with 50 grams of malononitrile. Then 200 mg of a 5:1 mixture of acetic acid and piperidine was added. After standing for another hour, the yellow brown crystals were filtered off, washed with water and recrystallized from hot methanol. NMR analysis proved to be consistent with the structure as shown.

Calculated 75.0% C, 3.9% H, 13.5% N; Experimental 74.2% C, 4.0% H, 13.0% N.

SYNTHETIC EXAMPLE 6

Dye 2

The product of Synthetic Example 1 (Compound A, approx. 4 g) was placed in 30 g of methanol, brought to a boil, and 1.0 μm of ethyl cyanoacetate was added along with a couple of drops of a 5:1 mixture of acetic acid and piperidine. The solution was boiled for 15 min. and the precipitate removed and recrystallized from methanol. The product was isolated as light yellow crystals.

Calculated 70.6% C, 5.1% H, 5.5% N;
Experimental 70.1% C, 5.1% H, 5.6% N.

SYNTHETIC EXAMPLE 7

Dye 3

The procedure from Example 6 was followed starting from the product of Synthetic Example 3 (Compound C) and ethyl cyanoacetate.

Calculated 67.4% C, 5.3% H, 4.9% N;
Experimental 67.5% C, 5.3% H, 5.1% N.

SYNTHETIC EXAMPLE 8

Dye 4

The product of Synthetic Example 2 (Compound B) was dissolved in 1 liter methanol with 50 g malononitrile. Then 200 mg of a 5:1 mixture of acetic acid and piperidine was added. After standing for another hour, the yellow crystals were filtered off and washed with water. NMR analysis proved to be consistent with the structure shown for Dye 4.

Calculated 70.6% C, 4.2% H, 11.8% N;
Experimental 70.5% C, 4.3% H, 11.5% N.

SYNTHETIC EXAMPLE 9

Dye 5

The procedure from Example 6 was followed starting from the product of Synthetic Example 2 (Compound B) and 3-methyl-1-phenyl-2-pyrazolin-5-one. After the reaction, the methanol was removed and the oil was extracted with methylene chloride and the solution filtered through silica gel. The methylene chloride was removed and the product recrystallized from acetone. The product was isolated as dark reddish crystals.

Calculated 75.9% C, 5.1% H, 8.9% N;
Experimental 75.6% C, 5.2% H, 8.7% N.

Mass spectrum parent peak 316 amu, theoretical 316.

SYNTHETIC EXAMPLE 10

Dye 6

The procedure from Example 6 was followed starting from the product of Synthetic Example 4 (Compound D) and malononitrile. The product was isolated as a yellow powder.

Calculated 64.3% C, 2.9% H, 10.8% N;
Experimental 64.1% C, 3.1% H, 11.5% N.

SYNTHETIC EXAMPLE 11

Dye 7

The procedure from Example 6 was followed starting from the product of Synthetic Example 2 (Compound D) and ethyl cyanoacetate. The product was isolated as an orange powder.

Calculated 62.2% C, 4.2% H, 4.8% N;
Experimental 60.9% C, 4.1% H, 5.1% N.

SYNTHETIC EXAMPLE 12

Dye 8

A stirred solution of 4.00 g (25 mmol) of the product from Synthetic Example 1 (Compound A), 3.27 g (27 mmol) methyl sulfonyl acetonitrile, 4 drops of piperidine, and 50 ml ethanol was heated at reflux for 16 hrs, and then cooled to -10° C. The resulting yellow precipitate was collected and washed with cold methanol, and then air-dried. The product was recrystallized from acetonitrile and then dried in vacuo over CaSO$_4$ to provide 3.8 g (58%) yellow crystals.

Calculated 59.76% C, 4.24% H, 5.36% N, 12.27% S;
Experimental 59.74% C, 4.07% H, 5.32% N, 11.83% S.

SYNTHETIC EXAMPLE 13

Dye 9

A stirred solution of 5.00 g (31 mmol) the product from Synthetic Example 1 (Compound A), 4.98 g (34 mmol) benzoylacetonitrile, 4 drops piperidine, and 50 ml ethanol was heated at reflux for 2 hrs, and then cooled to 25° C. The resulting orange precipitate was collected and washed with cold methanol, and then air-dried. The product was recrystallized from toluene, and then dried in vacuo over CaSO$_4$ to provide 4.1 g (46%) orange crystals.

Calculated 79.43% C, 4.56% H, 4.87% N;
Experimental 79.90% C, 4.78% H, 4.74% N.

SYNTHETIC EXAMPLE 14

Dye 10

A stirred suspension of 5.00 g-(31 mmol) the product from Synthetic Example 1 (Compound A), 4.40 g (34 mmol) of barbituric acid, 4 drops piperidine, and 25 ml ethanol was heated at reflux for 4 hrs, and then cooled to 25° C. The resulting orange precipitate was collected and washed with cold methanol, and then fir-dried. The product was recrystallized from pyridine, and then dried in vacuo at 80° C. to provide 4.5 g (53%) orange crystals.

Calculated 62.22% C, 3.73% H, 10.37% N;

Experimental 62.34% C, 4.02% H, 10.44% N.

SYNTHETIC EXAMPLE 15

Dye 11

A stirred suspension of 5.00 g (31 mmol) the product from Synthetic Example 1 (Compound A), 6.61 g (34 mmol) 5-chloro-2-benzoxazolacetonitrile, 4 drops piperidine, and 50 ml ethanol was heated at reflux for 5 hrs, and then cooled to 25 ° C. The resulting orange precipitate was collected and washed with cold methanol, and then air-dried. The product was recrystallized from pyridine, and then dried in vacuo at 80° C. to provide 7.1 g (68%) orange crystals.

Calculated 68.17% C, 3.31% H, 8.37% N, 10.59% Cl;

Experimental 68.27% C, 3.74% H, 8.44% N, 10.16% Cl.

SYNTHETIC EXAMPLE 16

Dye 12

A stirred mixture of 5.00 g (31 mmol) the product from Synthetic Example 1 (Compound A), 4.95 g (34 mmol) 2-2-dimethyl-1,3-dioxane-4,6-dione (Meldrum's acid), 0.5 ml acetic acid, 4 drops of piperidine, and 40 ml of toluene was heated at reflux for 18 hrs with continuous azeotropic removal of water. The reaction mixture was cooled to 25° C., and then the resulting orange precipitate was collected, washed with cold methanol, and air-dried. The product was recrystallized from toluene, and then dried in vacuo over CaSO$_4$ to provide 1.0 g (11%) orange crystals.

Calculated 67.13% C, 4.93% H;

Experimental 67.32% C, 4.97% H.

SYNTHETIC EXAMPLE 17

Dye 13

Sodium hydride dispersion (60% in mineral oil, 1.37 g, 34 mmol) was washed three times under nitrogen with ligroin. Solutions of 9.56 g (34 mmol) of dimethyl [[(4-methylsulfonyl)phenyl]methyl]phosphonate in 50 ml dry tetrahydrofuran and 5.00 g (31 mmol) the product from Synthetic Example 1 (Compound A) in 50 ml dry tetrahydrofuran were added successively. Four drops 12-crown-4 was added, and then the stirred reaction mixture was heated at reflux under nitrogen for 16 hrs. The mixture was cooled to 25° C. and then poured into 300 ml of water. The precipitated product was collected, washed with water, and then air-dried. The product was recrystallized from acetonitrile to provide 7.0 g (71%) yellow powder.

Calculated 69.21% C, 5.16% H, 10.26% S;

Experimental 69.12% C, 5.00% H, 10.21% S.

SYNTHETIC EXAMPLE 18

Dye 14

A stirred mixture 5.00 g (31 mmol) the product from Synthetic Example 1 (Compound A), 7.70 g (34 mmol) triethylphosphonoacetate, 11.2 g (34 mmol) cesium carbonate, and 50 ml tetrahydrofuran, and 0.5 ml water was heated at reflux for 16 hrs, and then cooled to 25° C. The reaction mixture was poured into 300 ml water, and the precipitated product was collected, washed with water, and then air-dried. The product was recrystallized from ethanol to provide 5.5 g (76%) pale yellow plates.

Calculated 73.03% C, 6.13% H;

Experimental 72.81% C, 6.11% H.

The invention has been described in detail with particular reference to preferred embodiments thereof, but it will be understood that variations and modifications can be effected within the spirit and scope of the invention.

What is claimed is:

1. A dye-donor or recording element comprising a support having thereon a dye layer comprising a yellow dye in a polymeric binder, said dye having the formula:

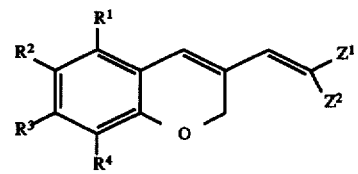

wherein:

$R^1$, $R^2$, $R^3$ and $R^4$ each independently represents hydrogen, halogen, hydroxy, nitro, a substituted or unsubstituted alkyl or alkoxy group of from 1 to about 6 carbon atoms, a substituted or unsubstituted phenyl group, an alkylazo group, or an arylazo group;

or any two adjacent $R^1$, $R^2$, $R^3$ and $R^4$ groups may be taken together with the phenyl ring to which they are attached to form a fused ring system; and $Z^1$ and $Z^2$ each independently represents hydrogen or a moiety having a Hammer Sigma (meta) Constant greater than 0.3, such as cyano, esterified carboxy, amide, benzoxazole, alkylsulfonyl, arylsulfonyl; or may be taken together to form a group having a Hammet Sigma (meta) Constant greater than 0.3.

2. The element of claim 1 wherein said dye layer has an infrared-absorbing material associated therewith.

3. The element of claim 1 wherein $R^1$, $R^3$ and $R^4$ each represent hydrogen and $R^2$ represents hydrogen or chloro.

4. The element of claim 1 wherein $Z^1$ represents CN and $Z^2$ represents CN, COOC$_2$H$_5$, SO$_2$CH$_3$ or COC$_6$H$_5$.

5. The element of claim 1 wherein said support comprises poly(ethylene terephthalate) and the side of the support opposite the side having thereon said dye layer is coated with a slipping layer comprising a lubricating material.

6. The element of claim 1 wherein said dye layer comprises repeating areas of cyan, magenta, and said yellow dye having the formula as specified.

7. A process of forming a dye transfer image comprising imagewise-heating a dye-donor element comprising a support having thereon a dye layer comprising a dye dispersed in a polymeric binder and transferring a dye image to a dye-receiving element to form said dye transfer image, wherein said dye has the formula:

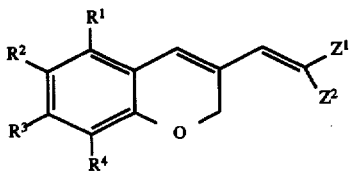

wherein:
R¹, R², R³ and R⁴ each independently represents hydrogen, halogen, hydroxy, nitro, a substituted or unsubstituted alkyl or alkoxy group of from 1 to about 6 carbon atoms, a substituted or unsubstituted phenyl group, an alkylazo group, or an arylazo group;

or any two adjacent R¹, R², R³ and R⁴ groups may be taken together with the phenyl ring to which they are attached to form a fused ring system; and Z¹ and Z² each independently represents hydrogen or a moiety having a Hammet Sigma (meta) Constant greater than 0.3, such as cyano, esterified carboxy, amide, benzoxazole, alkylsulfonyl, arylsulfonyl; or may be taken together to form a group having a Hammet Sigma (meta) Constant greater than 0.3.

8. The process of claim 7 wherein said dye layer has an infrared-absorbing material associated therewith.

9. The process of claim 7 wherein R¹, R³ and R⁴ each represent hydrogen and R² represents hydrogen or chloro.

10. The process of claim 7 wherein Z¹ represents CN and Z² represents CN, COOC₂H₅, SO₂CH₃ or COC₆H₅.

11. The process of claim 7 wherein said support comprises poly(ethylene terephthalate) and the side of the support opposite the side having thereon said dye layer is coated with a slipping layer comprising a lubricating material.

12. The process of claim 7 wherein said dye layer comprises repeating areas of cyan, magenta, and said yellow dye having the formula as specified.

13. The process of claim 7 wherein said support is poly(ethylene terephthalate) which is coated with sequential repeating areas of cyan, magenta and said yellow dye having the formula as specified, and said process steps are sequentially performed for each color to obtain a three-color dye transfer image.

14. A process of forming a single color, ablation image comprising:

a) imagewise-heating, by means of a laser, an ablative recording element comprising a support having thereon an image layer comprising an image dye dispersed in a polymeric binder, which causes said image layer to ablate imagewise, said image layer having a near infrared-absorbing material associated therewith to absorb at a given wavelength of the laser used to expose said element, said image dye absorbing in the region of from about 300 to about 700 nm; and b) removing said ablated material to obtain an image in said ablative recording element;

wherein said image dye has the formula:

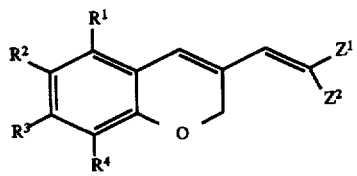

wherein:
R¹, R², R³ and R⁴ each independently represents hydrogen, halogen, hydroxy, nitro, a substituted or unsubstituted alkyl or alkoxy group of from 1 to about 6 carbon atoms, a substituted or unsubstituted phenyl group, an alkylazo group, or an arylazo group;

or any two adjacent R¹, R², R³ and R⁴ groups may be taken together with the phenyl ring to which they are attached to form a fused ring system; and Z¹ and Z² each independently represents hydrogen or a moiety having a Hammet Sigma (meta) Constant greater than 0.3, such as cyano, esterified carboxy, amide, benzoxazole, alkylsulfonyl, arylsulfonyl; or may be taken together to form a group having a Hammet Sigma (meta) Constant greater than 0.3.

15. The process of claim 14 wherein R¹, R³ and R⁴ each represent hydrogen and R² represents hydrogen or chloro.

16. The process of claim 14 wherein Z¹ represents CN and Z² represents CN, COOC₂H₅, SO₂CH₃ or COC₆H₅.

* * * * *